M. Rigell.
Plow.

No. 100325 — Patented Mar. 1 1870

Witnesses:
Victor Hagmann
Jalor C. Remm

Inventor:
M. Rigell
per Munn & Co.
Attorneys.

UNITED STATES PATENT OFFICE.

MARK RIGELL, OF NEWTON, ALABAMA, ASSIGNOR TO HIMSELF, AND ROBT. D., WM. D., & ROBT. F. JOY, OF MILFORD, GEORGIA.

IMPROVEMENT IN PLOWS.

Specification forming part of Letters Patent No. 100,325, dated March 1, 1870.

*To all whom it may concern:*

Be it known that I, MARK RIGELL, of Newton, in the county of Dale and State of Alabama, have invented a new and Improved Plow; and I do hereby declare that the following is a full, clear, and exact description of the construction and operation of the same, reference being had to the accompanying drawings, making a part of this specification, in which—

Figure 1:
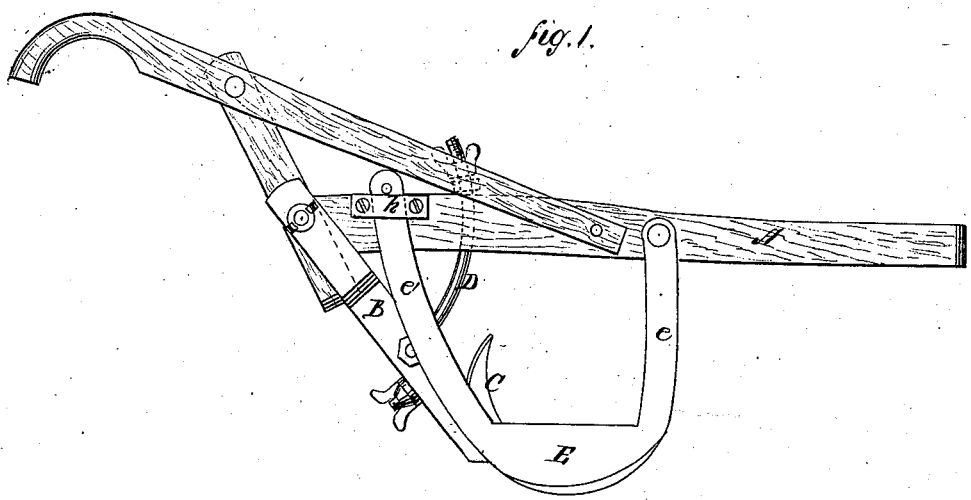
Figure 2:
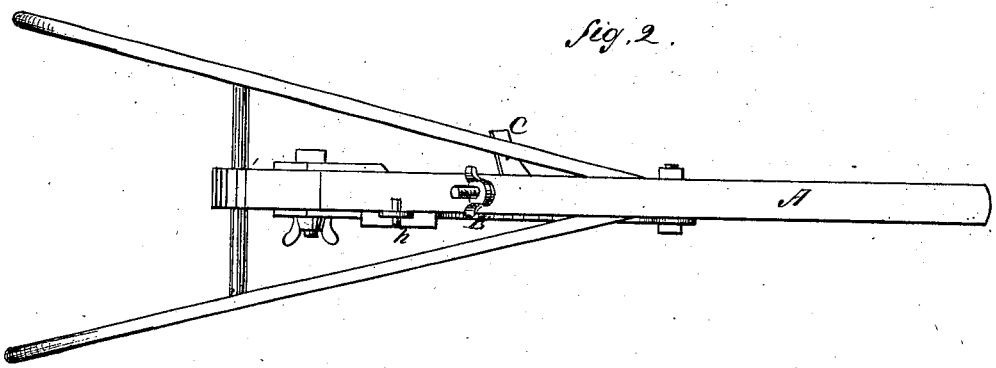

Figure 1 is a side elevation, and Fig. 2 is a plan view.

This invention consists in the combination of a plant-protector with a plow.

In the drawings, A is the plow-beam; B, the standard; C, the share; D, the adjustable brace by means of which the share is raised or lowered. All this is old.

The plant-protector consists of a blade, E, about parallel with the beam, placed by the side of the share, and provided with two curved arms, $e$ $e'$, one projecting upward from each corner of the blade, the arm $e$ being pivoted at its upper end to the side of the beam, and the arm $e'$ passing through a socket, $h$, attached to the same side of the beam in rear of the pivot of the arm $e$. On drawing the plow by the side of a row of plants, the blade E runs next them, keeping the soil from falling on them in lumps and in quantities sufficient to injure them, and yet allowing some portion of the soil to sift over upon the plants.

The pivoting of the arm $e$ allows the protector to yield before an immovable obstacle, after passing which it may be returned to its former position.

Having thus described my invention, what I claim as new, and desire to secure by Letters Patent, is—

The solid plate E, provided with pivoted arm $e$ and sliding arm $e'$, constructed and arranged to operate in connection with the share C and blow-beam A, in the manner and for the purpose specified.

MARK RIGELL.

Witnesses:
 SOLON C. KEMON,
 CHAS. A. PETITT.